Patented Sept. 5, 1922.

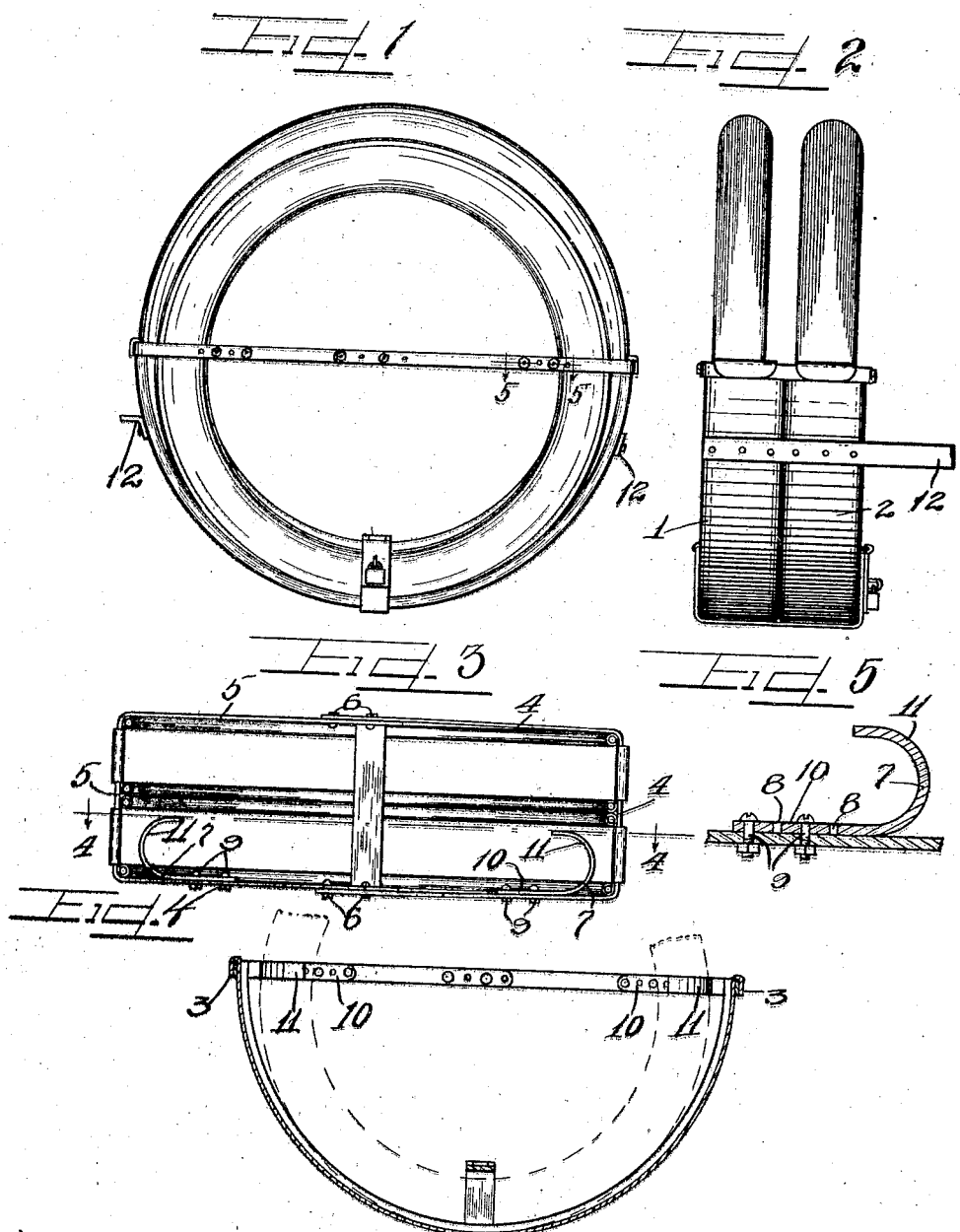

1,428,027

UNITED STATES PATENT OFFICE.

WALTER R. GREEN, OF CHICAGO, ILLINOIS.

ATTACHMENT FOR TIRE CARRIERS.

Application filed November 13, 1920. Serial No. 423,768.

*To all whom it may concern:*

Be it known that I, WALTER R. GREEN, a citizen of the United States, residing at the city of Chicago, in the county of Cook and State of Illinois, have invented a new and useful Improvement in Attachments for Tire Carriers; and I do hereby declare that the following is a full, clear, and exact description of the same, reference being had to the accompanying drawing, and to the numerals of reference marked thereon, which form a part of this specification.

My invention relates broadly to means whereby a tire carrier may be made adjustable for tires of different diameters, and comprises an attachment that is adapted to be applied to existing tire carriers as well as to new tire carriers.

At the present time there exists a tendency to provide motor cars with front wheels which are somewhat smaller than the rear wheels and it therefore becomes necessary to provide a tire carrier with means whereby it will accommodate both sizes of tires.

It is therefore broadly an object of my invention to provide an adjustable tire carrier that will carry tires of different diameters.

It is also an object of my invention to provide an attachment that may be placed upon a tire carrier to adapt the same to support tires of different diameters.

It is also an object of my invention to provide an adjustable tire carrier with an adjustable attachment.

It is a further object of my invention to make the attachment easily adjustable.

It is further an object of my invention to provide an attachment that is easily applied or removed, and that does not destroy the appearance of the carrier.

I attain these objects by means of a novel structure and arrangement of parts which will become more apparent from the description and disclosures in the drawing.

My invention in a preferred form is illustrated in the drawing and hereinafter more fully described.

On the drawings:

Figure 1 is a perspective view showing a tire carrier containing two tires of different diameter in accordance with my invention.

Figure 2 is an end elevation thereof.

Figure 3 is a top plan view of the tire carrier embodying my invention.

Figure 4 is a section on the line 4—4 of Figure 3.

Figure 5 is a section on the line 5—5 of Figure 1 showing my adjustable attachment.

In the specification—

In the drawings in which similar reference numerals refer to similar features in the different views, I have illustrated a form of tire carrier disclosed in my aforementioned application and have shown my attachment applied thereto. Briefly described the tire carrier comprises a U-shaped member having a pair of tire compartments 1 and 2 shown of substantially equal size. The upper edges of the member are bent or folded at 3 to provide a means for securing the adjustable reinforcing frame members 4 and 5 thereto which are adjustably bolted together in overlapping relation by bolts 6. The adjustability of these frame members makes it possible to adjust the carrier as a whole to a certain degree.

These adjustable frame members 4 and 5 are utilized in the present instance as supports for my adjustable attachments which comprise curved or hook shaped or tire holding members, designated as a whole by 7, designed to fit the transverse curvature of a tire. A plurality of bolt holes 8 are provided in the attaching portions 10 of each hook shaped member, and these holes are designed to receive the bolts 9 which pass through the frame members 4 and 5 for attaching the hook shaped members in position thereon. While I have shown each of the portions 10 provided with four bolt holes, two of which being designed to receive the supporting bolts at the same time, this is merely for the purpose of illustration, since I contemplate using as many adjustable bolt holes as necessary, or having them so close together that they may form a slot, or varying the form of adjustment as desirable from the standpoint of any other carrier to which it may be adaptable.

In the drawings, I have shown my attachments secured to the inner side of the outer portions of the frame members 4 and 5, but they may be secured to the inner side of the inner portions if so desired, or to both inner sides if found necessary. It will be noted that the curved or hooked portions 11 of the attachments extend transversely substantially across the tire chamber of a compartment so as to receive the tire rim and 1 hold the tire firmly in place, and thus my carrier is provided with two different sized compartments.

In applying my attachments to a tire carrier of any design it is contemplated that they should be so spaced as to engage the circumference of the tire that is to be carried, as the attachments are adjustable, the distance between them can always be varied to snugly fit a tire; and the adjustment is such that tires of different diameters may be supported therebetween at different times.

In using my adjustable attachments in connection with my adjustable tire carrier, it is possible to adjust the carrier as a whole by means of the adjustable frame members 4 and 5; the hooked shaped members in one of the two tire compartments may then be adjusted to provide a supplemental adjustment for that compartment. The carrier itself may be supported from the rear of the car and in Figures 1 and 2 I have illustrated attaching brackets 12 for such a purpose. It will therefore be apparent that I have provided an adjustable attachment for tire carriers that may be applied to different carriers, both old and new, and that when used in my adjustable carrier provides a supplemental adjustment for a compartment that is light but strong and rigid and easily applied and adapted for accomplishing the function set forth.

I am aware that numerous details of construction may be varied through a wide range without departing from the principles of this invention, and I therefore do not purpose limiting the patent granted otherwise than necessitated by the prior art.

I claim as my invention:

1. A tire carrier having a plurality of compartments, means for simultaneously adjusting said compartments, and means in one compartment adjustable with respect thereto to provide a supplemental adjustment therefor, said means having a tire holding portion extending transversely of said compartment.

2. A tire carrier having a plurality of tire holding compartments, means to adjust said carrier so as to adjust said compartments simultaneously, one of said compartments comprising tire holding devices and means for adjusting said devices independently of the first adjusting means.

3. In a tire carrier having a compartment adapted to receive a tire therein, a tire holding member secured to the inner wall of said compartment and having a portion extending transversely of said compartment, and means for adjusting said member for accommodating tires of different diameters.

4. In a tire carrier, a substantially semi-circular member defining an interior compartment adapted for receiving a tire, a strip spanning the upper terminals of said member, and a tire holding device secured on said strip and adjustable for accommodating tires of different diameters.

5. In a tire carrier having a plurality of tire supporting compartments, an attachment therefor comprising a member having a securing portion and a tire contacting portion, and means for securing said member in one of said compartments for holding a tire of less diameter than in the other compartment.

In testimony whereof I have hereunto subscribed my name in the presence of two subscribing witnesses.

WALTER R. GREEN.

Witnesses:
CHARLES HILLS, Jr.,
EARL M. HARDINE.